Figure 1:
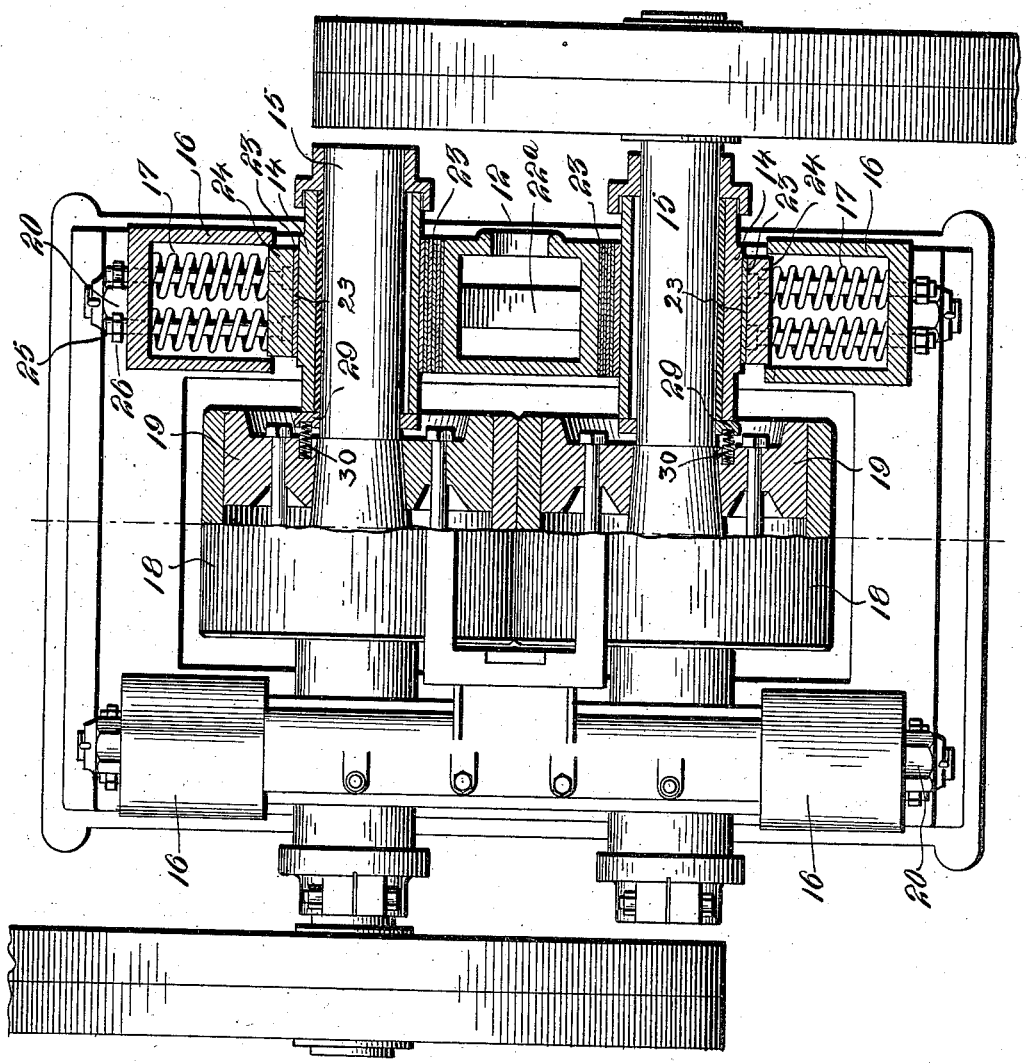

T. L. & T. J. STURTEVANT.
ROLL CRUSHING MACHINE.
APPLICATION FILED APR. 1, 1908.

1,045,454.

Patented Nov. 26, 1912.

3 SHEETS—SHEET 1.

WITNESSES:

INVENTORS:
Thomas L. Sturtevant
Thomas J. Sturtevant

BY

Attorneys.

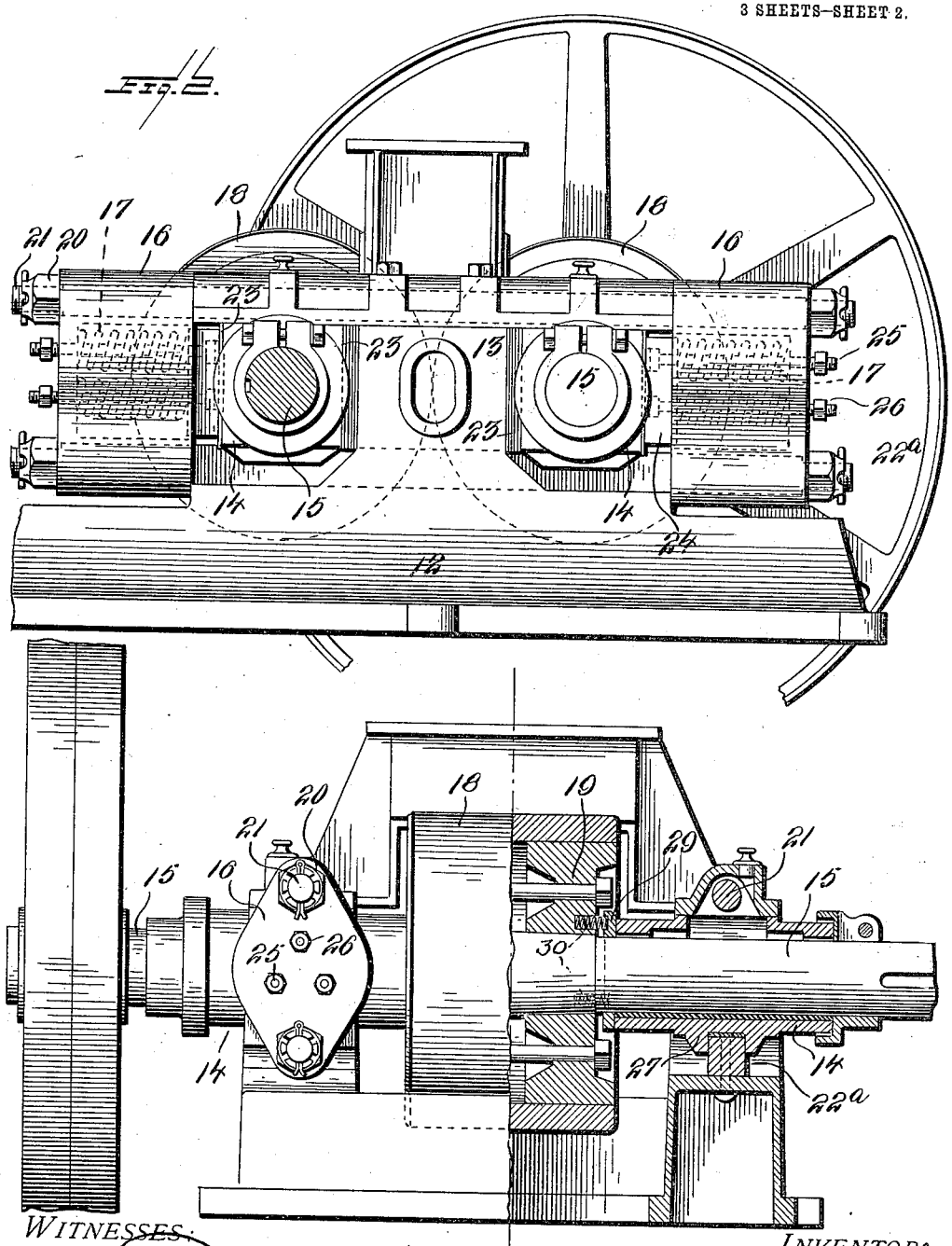

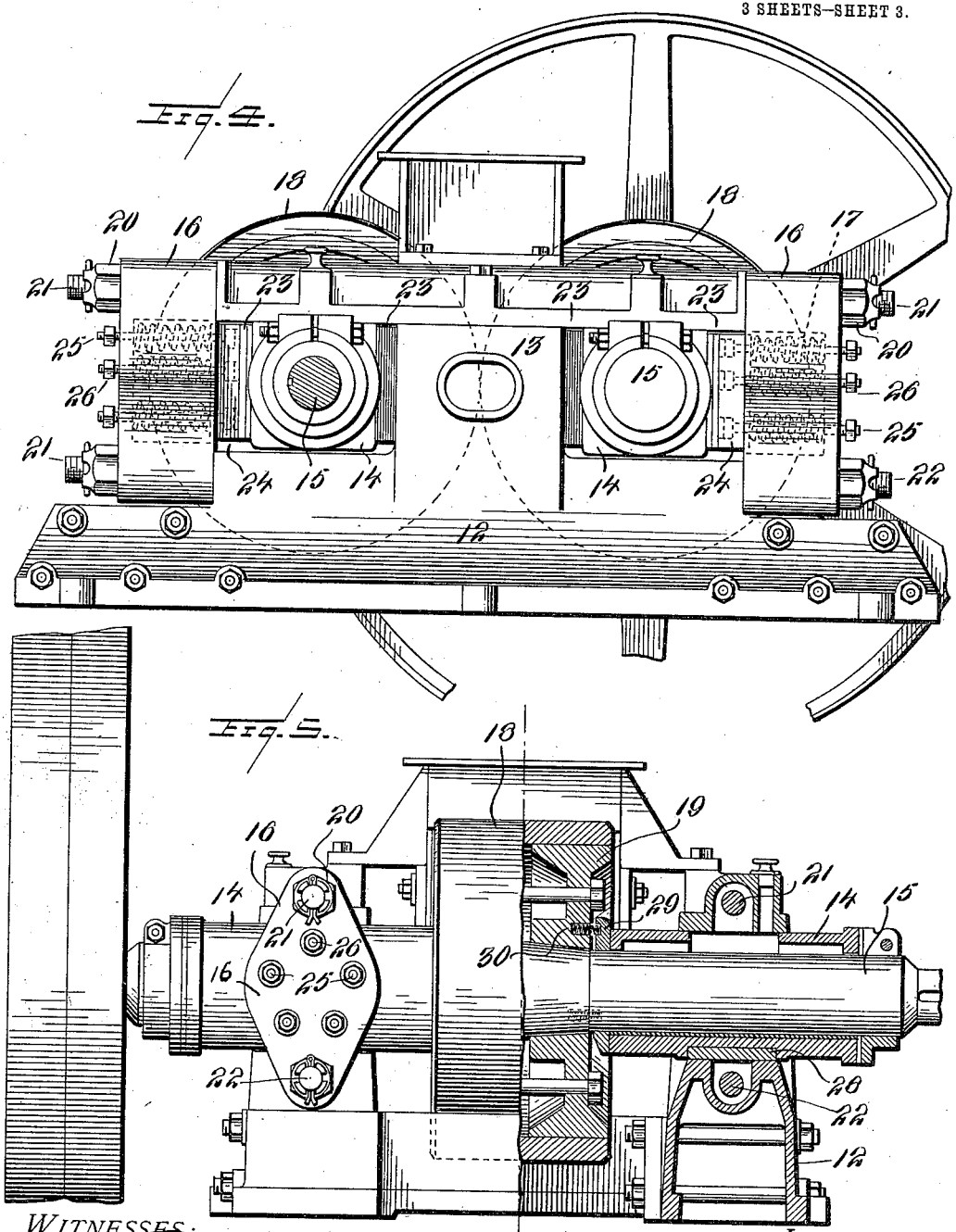

UNITED STATES PATENT OFFICE.

THOMAS LEGGETT STURTEVANT, OF QUINCY, AND THOMAS J. STURTEVANT, OF WELLESLEY, MASSACHUSETTS, ASSIGNORS TO STURTEVANT MILL COMPANY, A CORPORATION OF MAINE.

ROLL CRUSHING-MACHINE.

1,045,454.  Specification of Letters Patent.  Patented Nov. 26, 1912.

Application filed April 1, 1908. Serial No. 424,570.

*To all whom it may concern:*

Be it known that we, THOMAS L. STURTEVANT and THOMAS J. STURTEVANT, citizens of the United States, residing, respectively, at Quincy and Wellesley, in the county of Norfolk and State of Massachusetts, have invented or discovered certain new and useful Improvements in Roll Crushing-Machines, of which the following is a specification, reference being had therein to the accompanying drawings.

This invention relates to roll crushing machines, and comprises certain improvements on the styles of machines shown and described in our Patents No. 779,662, granted Jan. 10, 1905, and No. 855,358, granted May 28, 1907.

The object of the present invention is to provide roll crushing machines which may be constructed at very much less cost than similar machines of the same capacity heretofore in use, and which will also be stronger, so as to better resist the strains incidental to the crushing operations, and thereby render the machine more durable, as also to maintain the normal roll spring pressures.

In the accompanying drawings, Figure 1 is a plan view of one form of roll crushing machine embodying the present invention. Fig. 2 is a side view of the same, and Fig. 3 is an end elevation of the same, partly in vertical section. Fig. 4 is a side view of a slightly different form of machine from that shown in Figs. 1, 2 and 3, and Fig. 5 is an end elevation, partly in vertical section, of the form of machine shown in Fig. 4.

Referring to the drawings, 12 denotes the side pieces of the machine frame, and these side pieces may be integral with the cross pieces or end pieces of the frame, as shown in Figs. 1, 2 and 3, or may be made separate from said cross pieces and end pieces and bolted thereto, as shown in Figs. 4 and 5. This sectional construction, as shown in Figs. 4 and 5, is preferable for convenience in transportation, particularly in mountainous countries and over bad roads, in that the machine frames may be taken apart so that the individual pieces thereof can be more readily carried. Each of the side pieces of the frame is constructed with a central abutment 13 on the opposite sides of which the bearing boxes 14 for the shafts 15 are arranged; and said side pieces of the frame are notched or stepped at their opposite ends to provide recesses for the reception of the hollow boxes or holders 16 in which are housed the springs 17, which, acting on the said bearing boxes 14, serve to force the crushing rolls 18 yieldingly toward each other. This notched or stepped construction of the side pieces of the frame is advantageous in that by this construction the frame may be made shorter or lower than it otherwise could be, and still provide proper outer vertical shoulders or abutments on the side pieces of the frame against which the said boxes or holders 16 are held by the nuts 20 on the upper and lower tie rods 21 and 22 or 22ª which pass, respectively, above and below the roll-shaft bearing-boxes 14; so as to provide great strength for the shocks incidental to the strain of the crushing operations, as also to provide an even resistance to the pressure afforded by the springs 17 nested within the boxes or holders 16. The abutments 13 serve as rigid inner supports for the bearing boxes 14.

The tires of the rolls 18 are preferably connected with the shaft 15 by means of expansible and contractible rings or roll hearts 19 interposed between conical or tapered portions of the shafts 15 and the tires of said rolls, as fully shown and described in our application No. 371,177, filed April 30, 1907.

To provide for the proper regulation of the crushing rolls, so that their faces may be in any desired proximity to each other, a series of shims or adjusting plates 23 are interposed between the abutments 13 and the bearing boxes 14, and also preferably between the said bearing boxes and blocks or followers 24 against which the springs 17 abut. By removing one or more of these shims or adjusting plates from one side of the bearing boxes and placing them on the other side thereof the working positions of the rolls 18, to bring their faces nearer to or farther from each other, may be varied, as will be understood, without varying the stress of the springs 17; but if it be desired to increase or lessen the stress of the said springs a greater or lesser number of these shims or adjusting plates may be used at one side or the other of each bearing box, thereby compressing or relaxing the springs. In other words, by inserting more of these shims or adjusting plates the springs 17 will be compressed, thus increasing their stress, and by taking out some of the shims or plates the stress of the springs will be relaxed.

To provide for the convenient insertion or removal of the shims or adjusting plates, as also to provide for the convenient insertion or removal of the bearing boxes, it is necessary that the pressure of the springs against the bearing boxes or against the shims or adjusting plates be relaxed. To this end we provide a series of bolts 25 having heads at their inner ends which are received in recesses in the blocks or followers 24 and which are provided at their threaded outer ends with nuts 26 which may be screwed up against the outer faces of the holders or housings 16 so as to withdraw the blocks or followers 24 and thereby remove the pressure of the springs 17 from the bearing boxes 14, or from the shims or adjusting plates interposed between said boxes and the blocks or followers 24 and the abutments 13.

The lower tie rods may be either of the round form shown in Fig. 5, or of the rectangular form shown in Fig. 3, in which latter the lower tie rod 22ª is represented as being bolted or riveted to a side piece of the frame, and is provided with an attached wearing plate 27 on which the bearing boxes 14 can slide back and forth as they vibrate more or less in the crushing operation; while in the construction shown in Fig. 5 the wearing plate 28 rests directly on a side piece 12 of the frame.

To prevent dust or grit from the chamber of the mill from working into the bearings of the shafts, dust-collars 29 are provided, these collars being yieldingly pressed outward against the bearing boxes by a spring or springs interposed between the expansible rings or roll hearts 19 and the dust collars; the latter of course rotating with the shafts and roll hearts and having a close sliding fit on the shafts, so as to prevent dust or grit from passing at the points where they are located.

Owing to the fact that both crushing rolls of the present improved machines are yieldingly mounted in movable bearings and are pressed toward each other by springs, the said rolls are evenly balanced so that, when in operation, they move oppositely at equal distances at the same and equal times. Thus in the operation of these "balanced-roll" crushing machines the wear and strain is very much less than in what may be termed "plain roll" crushing machines in which one roll is mounted in fixed bearings and the other roll is movable toward and from said fixed-bearing roll, as in such machines the rolls pound each other severely, having no balanced shock-absorbing capacities or movements, as in the balanced roll machines, and the wear and tear of the plain roll machines is therefore very much greater than with the balanced roll machines in which both rolls are mounted in movable bearings pressed toward each other equally by springs.

The construction hereinbefore described provides a roll crushing machine of compact form and great strength and durability, as also a machine which may be made at very much less cost than similar machines of the same capacity heretofore in use, and also one that, because of the separability of parts, is more conveniently portable than said similar prior machines.

Having thus described our invention, we claim and desire to secure by Letters Patent:—

1. A roll crushing machine of the balanced type, comprising a frame having shaft-supporting side-pieces which are continuous longitudinally of the machine and which side pieces are provided with central abutments, combined with movable bearing-boxes located on opposite sides of said abutments which oppose the movements of said boxes toward each other, roll-carrying shafts journaled in said boxes, oppositely-acting springs, one set acting on each of said boxes, for forcing the rolls carried by said shafts toward each other and serving to press said boxes toward the opposite sides of said abutments, holders for said springs, and tie rods located both above and below said bearing boxes and serving to secure said holders in place.

2. In a roll-crushing machine of the balanced type, the combination with a frame comprising continuous side-pieces having stepped or recessed outer ends, of roll-carrying shafts, bearing-boxes in which said shafts are journaled, oppositely-acting springs, one set acting on each of said boxes, for forcing the rolls carried by said shafts toward each other, holders for said springs, said holders being formed separate from said side pieces and being located in the recesses afforded by the stepped or recessed ends of the said side-pieces, and means for securing the said holders in place.

3. In a roll crushing machine of the balanced type, the combination with a frame comprising continuous side-pieces having stepped or recessed outer ends, of two roll-carrying shafts, movable bearing-boxes in which both of said shafts are journaled, oppositely-acting springs, one set acting on each of said boxes, for forcing the rolls carried by said shafts toward each other, holders for said springs, said holders being formed separate from said side pieces and being located in the recesses afforded by the stepped or recessed ends of the said side-pieces, and tie-rods, located both above and below said bearing boxes, for securing the said holders in place.

4. In a roll-crushing machine, the combination with a suitable frame comprising continuous side pieces having central abutments, of bearing-boxes located at opposite sides of said abutments, roll-carrying shafts journaled in said boxes, oppositely-acting springs, one set of which acts on each of said boxes, for forcing the rolls carried by said shafts toward each other, and shims or adjusting plates on both sides of said bearing boxes and a part of which are interposed between the latter and said springs, and by which the positions of the roll-carrying shafts and the rolls may be varied to locate the rolls nearer to or farther from each other without varying the stress of said springs, or by the use of a greater or lesser number of which the stress of said springs may be varied.

5. In a roll-crushing machine, the combination with a suitable frame comprising continuous side pieces having abutments, of bearing boxes located on opposite sides of said abutments, roll-carrying shafts journaled in said boxes, oppositely-acting springs, one set of which acts on each of said boxes, for forcing the rolls carried by said shafts toward each other, shims or adjusting plates on both sides of said bearing-boxes and a part of which are interposed between the latter and said springs, and by which the positions of the roll-carrying shafts and the rolls may be varied to locate the rolls nearer to or farther from each other without varying the stress of said springs, or by the use of a greater or lesser number of which the stress of said springs may be varied, followers by which the stress of the springs is conveyed to the said bearing-boxes, and means for withdrawing the said followers so as to relieve the pressure of said springs from the bearing-boxes and said shims or adjusting plates when it is desired to remove or change the said boxes or shims.

6. In a roll-crushing machine of the balanced type, the combination with a frame comprising side-pieces which are continuous longitudinally and which have shoulders, at their outer ends, and central abutments, of movable bearing boxes located on opposite sides of said abutments, shafts journaled in said boxes, rolls carried by said shafts, oppositely-acting springs, one set of which acts on each of said boxes, and which are located near each end of each of said side-pieces, said springs serving to force the said rolls yieldingly toward each other, holders for said springs abutting against said outer end shoulders, and tie-rods for securing said holders in place.

7. In a balanced-roll crushing machine, the combination with a frame comprising side pieces which are continuous longitudinally and which have ends providing shoulders, roll-carrying shafts, movably-mounted bearing boxes in which said shafts are journaled, opposing springs of equal power for forcing the rolls carried by said shafts toward each other, one set of said springs acting on each of said boxes, holders in which said springs are held, and means for securing said holders in place on the said side pieces.

8. In a balanced-roll crushing-machine, the combination with a frame comprising side-pieces which are continuous longitudinally and which have outer end shoulders and central abutments, movable bearing boxes supported by said side pieces, roll-carrying shafts mounted in said bearing boxes, oppositely-acting springs, one set of which acts on each of said boxes, and which serve to force the rolls carried by said shafts toward each other and toward said abutments, holders for said springs, said holders abutting against shoulders on said side pieces, and tie rods for securing the said holders in place.

9. In a balanced-roll crushing-machine, the combination with a frame comprising side pieces which are continuous longitudinally just below the horizontal plane of the shaft bearings and which have stepped or recessed ends providing vertical shoulders, roll-carrying shafts, movably-mounted bearing boxes in which said shafts are journaled, opposing springs of equal power on opposite sides of said shafts, for forcing the rolls carried by said shafts toward each other, holders in which said springs are housed and which are located in the recesses afforded by the stepped or recessed ends of the said side pieces of the frames and abut against said shoulders, and means for securing said holders in place.

10. In a balanced-roll crushing-machine, the combination with a frame comprising side-pieces which are continuous longitudinally below the horizontal plane of the shaft bearings and which have stepped or recessed ends providing vertical shoulders, of movable bearing boxes mounted in the recesses of said side-pieces, roll-carrying shafts mounted in said bearings, oppositely-acting springs for forcing the rolls carried by said shafts toward each other, one set of said springs acting on each of said bearing boxes, holders in which said springs are housed and which holders abut against the said shoulders of said side pieces, and tie rods for securing the said holders in place.

11. In a balanced-roll crushing-machine, a frame comprising side-pieces which are continuous longitudinally and which have central abutments and stepped or recessed ends, boxes located in the recesses afforded by said stepped ends, oppositely acting springs housed in said boxes, one set of said springs acting on each of said boxes, and longitudinal tie-rods serving to hold said boxes against shoulders or abutments afforded by said stepped or recessed ends; whereby compactness of construction of the machine is provided for.

12. A roll-crushing machine of the balanced type, comprising a frame having shaft-supporting side pieces which are continuous longitudinally in a horizontal plane, and which side pieces are each provided with a central abutment, movable bearing boxes on opposite sides of said abutments, and oppositely-acting balancing springs for forcing said boxes toward said abutments, combined with roll-carrying shafts journaled in said boxes, and tie-rods located both above and below said bearing boxes.

In testimony whereof we affix our signatures, in presence of two witnesses.

THOMAS LEGGETT STURTEVANT.
THOMAS J. STURTEVANT.

Witnesses:
L. H. STURTEVANT,
R. M. GAY.

Copies of this patent may be obtained for five cents each, by addressing the "Commissioner of Patents, Washington, D. C."